(12) United States Patent
Hashish et al.

(10) Patent No.: US 9,140,297 B2
(45) Date of Patent: Sep. 22, 2015

(54) RADIAL MAGNETIC VIBRATION DAMPING APPARATUS, BEARING SUPPORT ASSEMBLIES, AND OPERATIONAL METHODS

(71) Applicant: Siemens Industry, Inc., Alpharetta, GA (US)

(72) Inventors: Emam Hashish, Cincinnati, OH (US); Nicholas G. Lang, Cincinnati, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 184 days.

(21) Appl. No.: 13/654,561

(22) Filed: Oct. 18, 2012

(65) Prior Publication Data
US 2014/0111039 A1 Apr. 24, 2014

(51) Int. Cl.
*H02K 7/09* (2006.01)
*F16C 27/02* (2006.01)
*H02K 5/24* (2006.01)
*F16C 17/04* (2006.01)
*H02K 7/08* (2006.01)

(52) U.S. Cl.
CPC ................. *F16C 27/02* (2013.01); *F16C 17/04* (2013.01); *H02K 5/24* (2013.01); *H02K 7/08* (2013.01); *H02K 7/09* (2013.01)

(58) Field of Classification Search
None
See application file for complete search history.

(56) References Cited

U.S. PATENT DOCUMENTS

| | | |
|---|---|---|
| 5,304,006 A | 4/1994 | Ide |
| 5,521,448 A | 5/1996 | Rao |
| 5,660,481 A | 8/1997 | Ide |
| 6,388,347 B1 | 5/2002 | Blake |
| 6,420,810 B1 * | 7/2002 | Jeong ........................... 310/90.5 |
| 6,570,286 B1 * | 5/2003 | Gabrys ........................ 310/90.5 |
| 6,710,489 B1 * | 3/2004 | Gabrys ........................ 310/90.5 |
| 6,727,616 B1 | 4/2004 | Campbell |
| 7,956,499 B2 | 6/2011 | Aiello |

OTHER PUBLICATIONS

Paden, B., et al. "Design Formulas for Permanent-Magnet Bearings"; Journal of Mechanical Design; Dec. 2003, vol. 125; (5 pages).
Pending U.S. Patent Application entitled: "Passive Magnetic Bearings for Rotating Equipment Including Induction Machines" filed Aug. 30, 2011, U.S. Appl. No. 13/221,074; Nicholas G. Lang; (28 pages).

* cited by examiner

*Primary Examiner* — Tran Nguyen

(57) ABSTRACT

A bearing support assembly adapted to support and damp radial vibration of a rotor shaft of a vertical motor is disclosed. The bearing support assembly has a thrust bearing adapted to couple to a rotor shaft and carry axial thrust loads along an axial axis, and a radial magnetic damping apparatus having one or more magnetic field-producing members adapted to provide a radially-acting magnetic force to act upon the rotor shaft to reduce radial vibration thereof. Vertical motors and methods of operating the vertical motors are disclosed, as are other aspects.

8 Claims, 9 Drawing Sheets

RADIAL MAGNETIC VIBRATION DAMPING APPARATUS, BEARING SUPPORT ASSEMBLIES, AND OPERATIONAL METHODS

CROSS-REFERENCE TO RELATED APPLICATIONS

This application incorporates by reference in their entirety United States utility patent applications entitled "PASSIVE MAGNETIC BEARINGS FOR ROTATING EQUIPMENT INCLUDING INDUCTION MACHINES" filed Aug. 30, 2011, and assigned U.S. application Ser. No. 13/221,074, and "MAGNETIC BEARING APPARATUS AND METHOD FOR VARYING SHAFT THRUST LOAD SUPPORT IN INDUCTION MOTORS AND OTHER ROTATING MACHINERY" filed Oct. 18, 2012, and assigned U.S. application Ser. No. 13/654,577.

FIELD

The present invention relates generally to methods and apparatus for mitigating vibration in vertical machines, such as vertical electrical motors.

BACKGROUND

Within vertical machines (e.g., electrical motors), substantial thrust may be carried by an axial thrust bearing. In some cases, the axial thrust bearing may be a hydrodynamic fluid bearing. Such large vertical motors carrying high thrust often use hydrodynamic sleeve bearings as an upper and lower guide due to limitations on using a rolling element bearing. This gives the rotor the freedom to whirl with magnitude as large as the clearances in these guide bearings. Balancing the rotor may help reduce, but may not totally alleviate rotor whirl. Also, the rotor whirl may or may not subside when the axial load is applied. In some cases, attempts to mitigate rotor whirl have used sleeve bearing guides with adjustable tilting pads with extensive arbitrary adjustments. These sleeve bearing guide configurations may induce higher power loss and may require cooling. The rotor, which is normally very massive in such applications, transmits the whirl motion as motor vibration. Solutions to the rotor whirl problem have been elusive.

Thus, improved apparatus and methods to address rotor whirl in vertical machines (e.g., electrical motors) are sought.

SUMMARY

In a first embodiment, a bearing support assembly is provided. The bearing support assembly includes a thrust bearing adapted to couple to a rotor shaft and carry axial thrust loads along an axial axis, and a radial magnetic damping apparatus having one or more magnetic field-producing members adapted to provide radial magnetic force acting on the rotor shaft to reduce radial vibration thereof.

In a further assembly embodiment, a bearing support assembly is provided. The bearing support assembly includes a bearing housing, a rotor shaft, a thrust bearing assembly mounting the rotor shaft to the bearing housing and configured to carry axial thrust loads, and a radial magnetic damping apparatus having at least one magnetic field-producing member adapted to provide a radial magnetic force to reduce radial vibration transmitted between the rotor shaft and the bearing housing.

In a method aspect, a method of damping radial vibration of rotor shaft of a vertical motor is provided. The method includes providing a thrust bearing assembly coupled to the rotor shaft and carrying axial thrust loads along an axial axis, providing a radial magnetic damping apparatus coupled to the rotor shaft and having one or more magnetic field-producing members, and producing, by the one or more magnetic field-producing members, a radial restorative force acting on the rotor shaft to reduce radial vibration thereof.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the invention.

DESCRIPTION

In view of the foregoing difficulties, a bearing support assembly is provided that is configured and adapted to reduce radial vibration, such as rotor whirl. The inventive bearing support assemblies are particularly effective at controlling radial rotor vibration in vertical electric motors, such as those vibrations due to rotor whirl. In another aspect, an improved vertical motor is provided. The vertical motor has a vertical thrust bearing and a bearing support assembly including a radial magnetic damping apparatus. The radial magnetic damping apparatus has one or more magnetic field-producing members adapted to provide radially-acting magnetic forces that are adapted to act on the rotor shaft to act against and reduce radial vibration thereof. Methods of damping radial vibration of rotor shaft of a vertical motor are provided, as are other aspects.

As will become apparent from the various embodiments, the bearing support assembly advantageously may limit radial motion of a rotor shaft relative to a housing of the vertical motor or a bearing housing, and especially due to rotor whirl. The bearing support assembly advantageously provides centering of the rotor shaft without reducing the radial clearance which provides for minimum power loss in the vertical motor.

These and other embodiments of the bearing support assembly, vertical motors including bearing support assemblies, and methods of damping radial vibration of a rotor shaft of a vertical motor are described below with reference to FIGS. 1-11 herein. The drawings are not necessarily drawn to scale. Like numerals are used throughout to denote like elements.

Figure 1:
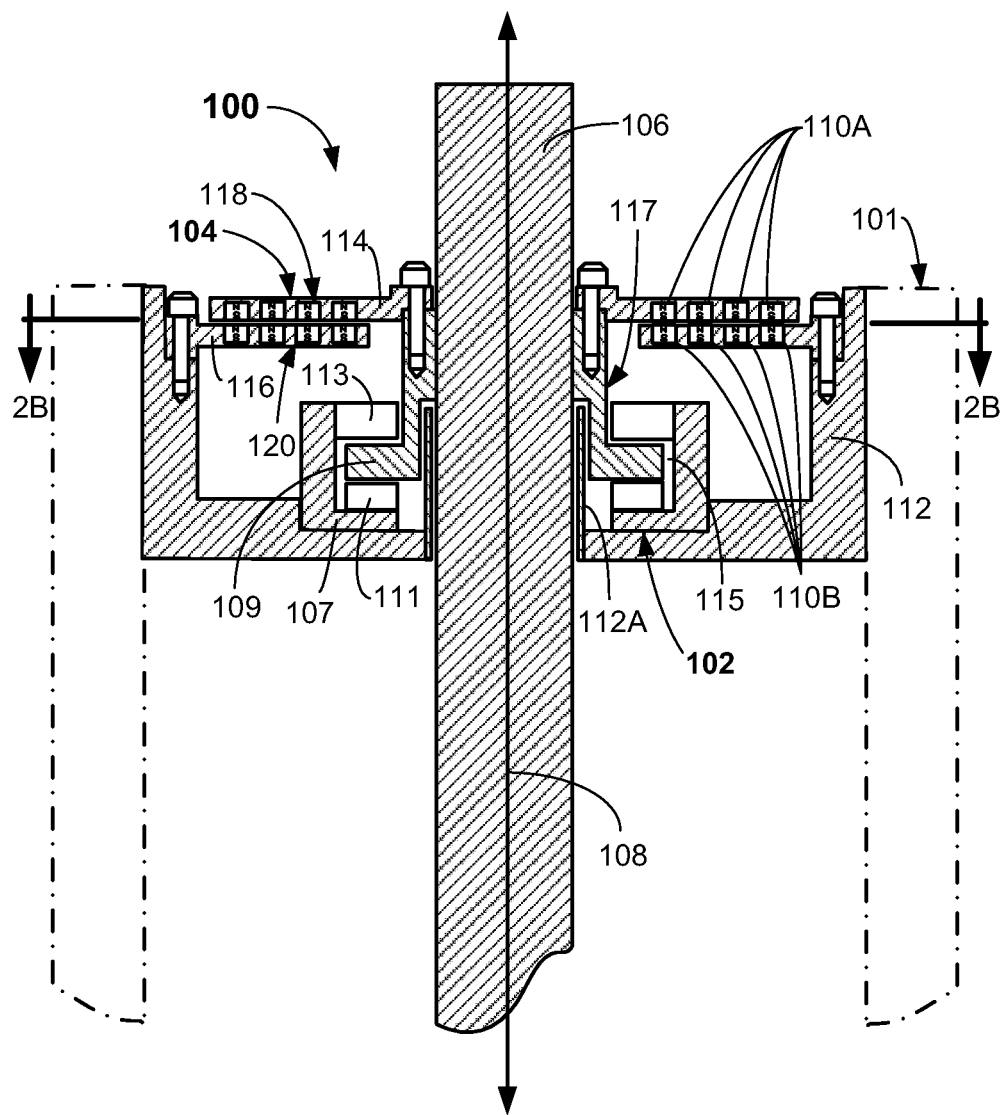
FIG. 1 illustrates a cross-sectioned side view of a bearing support assembly according to embodiments.

Referring now in specific detail to FIG. 1, a bearing support assembly 100 is shown in cross section. The bearing support assembly 100 may be installed as part of a vertical motor 101. The vertical motor 100 is adapted to operate with a rotor shaft 106 thereof being oriented in a vertical direction (along axial axis 108). In the depicted embodiment, the bearing support assembly 100 includes a thrust bearing assembly 102 and a radial magnetic damping apparatus 104. The thrust bearing assembly 102 is adapted to couple to a rotor shaft 106 and is configured and adapted to carry axial thrust loads along an axial axis 108 of the vertical motor 101. The thrust bearing assembly 102 may include an inner bearing member 107 adapted to couple to a bearing housing 112, and a thrust block member 109 adapted to couple to the rotor shaft 106. The thrust block member 109 may be part of or connected to the thrust load member 117. The thrust block member 109 is in contact with and carries axial force through an axial thrust support 111 coupled to the inner bearing member 107. The thrust block member 109 may be a cylindrical disk, for example. The axial thrust support 111 may be a steel material with a soft Babbitt face, for example. Other suitable materials may be used. In cases of reverse thrust caused by, for example, by pump shut off, reverse thrust support 113 is provided which may be made of a similar material. The reverse thrust support 113 may also be coupled to the inner bearing member 107. The thrust bearing assembly 102 supports axial loads, but allows generally unrestricted radial motion of the rotor shaft 106 by providing suitable radial gaps 115 between the inner bearing member 107 and the thrust block member 109. A suitable lubricating liquid (e.g., oil) may fill the thrust bearing assembly 102. An inner retaining wall 112A may prevent escape of the lubricating liquid. The mating surfaces of the axial thrust support 111 and the thrust block member 109 may be co-planar when in contact under thrust loading and oriented in a plane that is perpendicular to the axial axis 108. The thrust bearing assembly 102 thus does not provide any substantial radial support. Radial support and damping is provided by the radial magnetic damping apparatus 104.

The radial magnetic damping apparatus 104 has at least one, and in the depicted embodiment, more than one magnetic field-producing member, such as upper magnetic field-producing members 110A, and lower magnetic field-producing members 110B. The upper magnetic field-producing members 110A and lower magnetic field-producing members 110B interact with each other. The orientation of the upper magnetic field-producing members 110A and lower magnetic field-producing members 110B are configured and adapted to provide radial magnetic forces acting in a radial direction, generally normal to the axial axis 108. In the depicted embodiment, the magnetic field-producing members 110A, 110B may be permanent magnets. Each permanent magnet 110A, 110B may have a north (N) pole and a south (S) pole. The poles of the magnetic field-producing members 110A, 110B are arranged so that the magnetic forces thus produced act against motion of the rotor shaft 106 to produce a radial restorative force and reduce radial vibration thereof. Magnetic field-producing members 110A, 110B may be puck or disc-shaped magnets as shown, or ring magnets. Other magnet shapes may be sued.

In the depicted embodiment, the radial force is produced by interaction of the magnetic fields of at least a first magnetic field-producing member 110A and a second magnetic field-producing member 110B. The produced magnetic fields interact with each other to produce a radial restorative force to act against and thereby reduce radial vibration. In particular, the radial forces generated by the radial magnetic damping apparatus 104 may provide a radial restorative force acting between the rotor shaft 106 and a bearing housing 112, for example. In the depicted embodiment, the bearing housing 112 is part of the thrust bearing assembly 102. In more detail, the radial magnetic damping apparatus 104 may include at least an upper member 114 and a lower member 116 that may vertically overlap each other at least to some extent. In other embodiments a larger number overlapping members (e.g., three) may be provided in order to provide a zero net thrust condition as will be described more fully below. The upper member 114 may be coupled to the shaft 106, whereas the lower member 116 may be coupled to the bearing housing 112. In optional embodiments, the lower member 116 may be coupled to the housing of the motor 101.

In the depicted embodiment, the upper member 114 is coupled to the shaft 106 through the thrust load member 117, such as by bolting or other suitable connection means. The thrust load member 117 may be rigidly coupled to the shaft 106 by any suitable means, such as mechanical fastening, bolting, integral forming, or the like. The bearing housing 112 may be connected to the motor housing of the vertical motor 101 by any suitable means such as bolting, capturing, press fitting, or the like. The lower member 116 may be coupled to the bearing housing 112 such as at an end portion by suitable means, such as bolting or the like. The upper member 114 and lower member 116 may be planar discs, and overlap at least to some extent. Of course, the orientation may be reversed in some embodiments, wherein the upper member may be coupled to the bearing housing 112 and the lower member 116 may be coupled to the thrust load member 117.

Figure 2A:
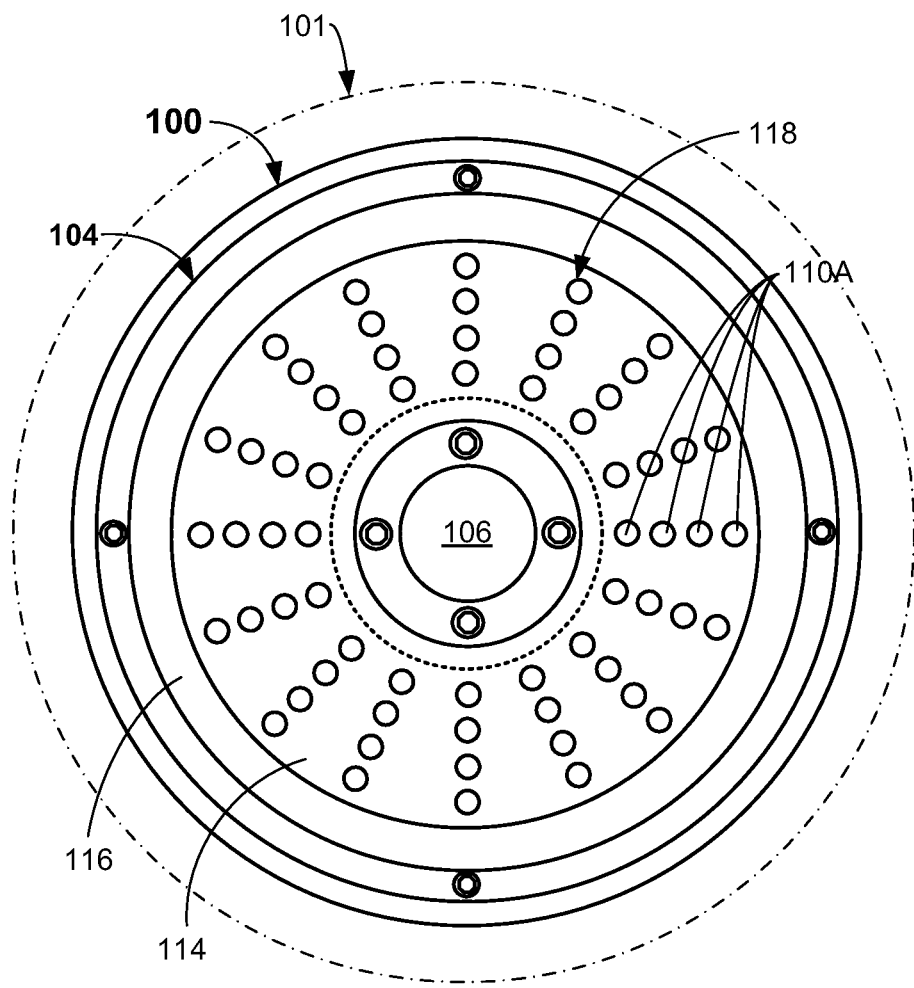
FIG. 2A illustrates a top plan view of a bearing support assembly according to embodiments.
Figure 2B:
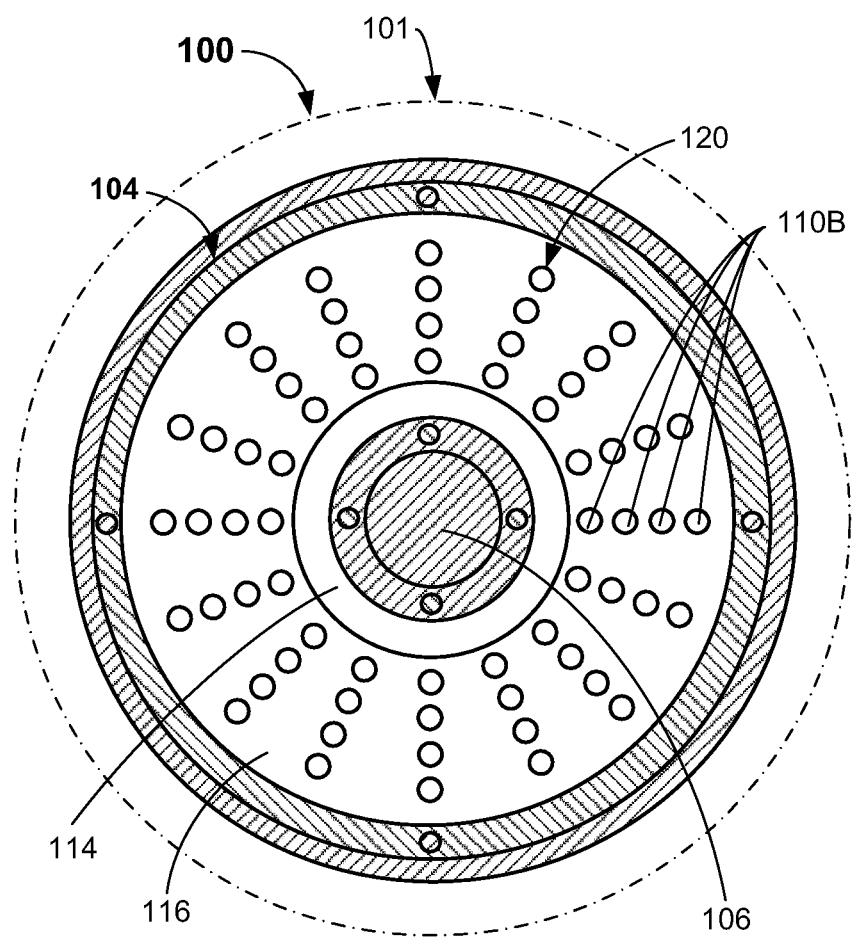
FIG. 2B illustrates a cross-sectioned top view of a bearing support assembly taken along section lines 2B-2B according to embodiments.

As depicted in FIG. 1 and FIGS. 2A and 2B, the radial magnetic damping apparatus 104 may include a first permanent magnet set 118 associated with the upper member 114 and a second permanent magnet set 120 associated with the lower member 116. The first permanent magnet set 118 and the second permanent magnet set 120 may each be made up of a plurality of the magnetic field-producing members 110A, 110B that are arranged in a suitable pattern. The plurality of the magnetic field-producing members 110A, 110B may be arranged in successively larger rings, and may be radially-aligned in some embodiments. Other patterns may be used. Each magnetic field-producing members 110A, 110B may be a permanent magnet having a north (N) pole and a south (S) pole. The magnets may be discs, pucks, or blocks. Other shapes may be used, such as ring magnets. The magnets may be, for example, unipolar magnets of samarium cobalt (SmCo), neodymium iron boron (NdFeB), or other types of rare earth magnetic materials. The magnets may each have a suitable remanence of between about 2000 gauss and 15000 gauss. Other strengths may be used. In the depicted embodiment, at least some, and preferably all, of the permanent magnets are vertically aligned with each other. That is, their axial axes are substantially aligned vertically with one another. For example, each of the permanent magnets may be aligned with a line passing through their North (N) and South (S) poles being oriented parallel to the axial axis 108. The N and S poles are provided directly adjacent to one another. The spacing between the N and S poles may be made as close as possible, but never in contact. Accordingly, the spacing should account for any axial motion tolerances provided by the axial thrust bearing assembly 102 when experiencing forward and reverse thrust in use.

Figure 2C:
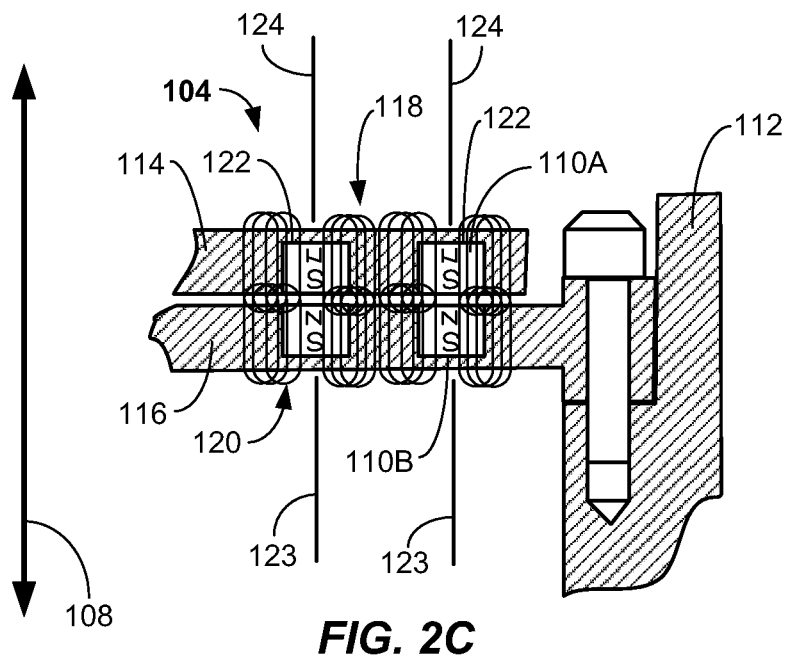
FIG. 2C illustrates a partial, cross-sectioned side view of a bearing support assembly illustrating an interaction of the magnetic fields of the magnetic field-producing members according to embodiments.

As best shown in FIG. 2C, the upper and lower members 114, 116 may be disc-shaped plates having a plurality of pockets 122 formed therein. The pockets 122 are adapted to receive the plurality of magnetic field-producing members 110A, 110B. Each of the upper and lower members 114, 116 may receive a permanent magnet set 118, 120 arranged in a pattern. The magnetic field-producing members 110A, 110B may be glued or otherwise secured in the pockets 122. As shown in FIG. 2C, one or more of the magnetic field-producing members 110A, 110B in the permanent magnet sets 118, 120 have a line 123, 124 passing through the north (N) poles and south (S) poles that are aligned generally parallel to the axial axis 108.

As shown in FIGS. 2A and 2B, the radial magnetic bearing apparatus 104 of the bearing support assembly 100 may include at least one permanent magnet set (e.g., permanent magnet set 118 and/or 120. The radial magnetic bearing apparatus 104 may have a first magnet set 118 that is mounted to an upper member 114 and a second magnet set 120 that is mounted to a lower member 116. The orientation of the magnetic field-producing members (e.g., permanent magnets) 110A, 110B may be such that a line 123, 124 passing through at least some of the magnetic field-producing members 110A, 110B in the first and second magnet sets are axially aligned. In the embodiment shown, all of the magnetic field-producing members 110A, 110B in the first and second magnet sets 118, 120 are substantially axially aligned in the vertical direction. The N and S poles of the magnetic field-producing members 110A, 110B that are substantially axially aligned are arranged such that an attractive force is produced between the first magnet set 118 that is mounted to the upper member 114 and the second magnet set 120 that is mounted to the lower member 116. Thus, any radial misalignment of the rotor shaft 106 due to vibration (e.g., rotor whirl) radially misaligns the magnet sets 118, 120 relative to one another and, thus, produces a restorative force opposing the motion of the rotor shaft 106. This restorative force functions to restore the rotor shaft 106 to a central location within the thrust bearing assembly 102 thereby reducing vibration and rotor whirl.

Figure 3:
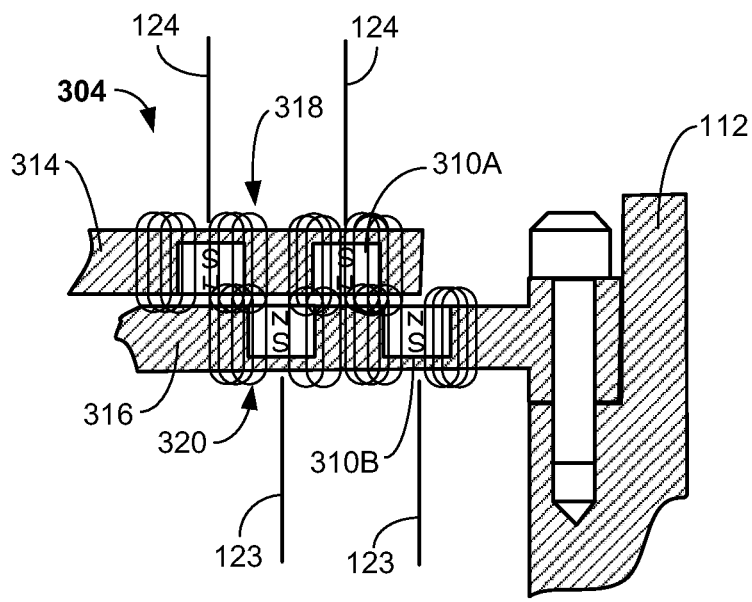
FIG. 3 illustrates a partial cross-sectioned side view of an alternative radial magnetic damping apparatus with misaligned magnetic field-producing members according to embodiments.

In another embodiment of a radial magnetic damping apparatus 304, as shown in FIG. 3, a first permanent magnet set 318 is mounted to an upper member 314, and a second permanent magnet set 320 that is mounted to a lower member 316. In the depicted embodiment, none of the magnetic field-producing members 310A, 310B (e.g., permanent magnets) in the first and second magnet sets 318, 320 are axially aligned when the thrust bearing assembly 102 is radially centered. Otherwise, the construction is as described above, except that on one of the upper and lower members 314, 316 the orientation of the N and S poles are reversed. Thus, in this embodiment, vibration of the rotor shaft 106 produces radial misalignment between the magnet sets 318, 320 from their nominal (steady-state or neutral) position and the repulsive forces between the N poles of the respective magnetic field-producing members 310A, 310B causes a restorative force to cause the rotor shaft 106 to move back towards a centered position in the thrust bearing assembly 102.

Figure 4:
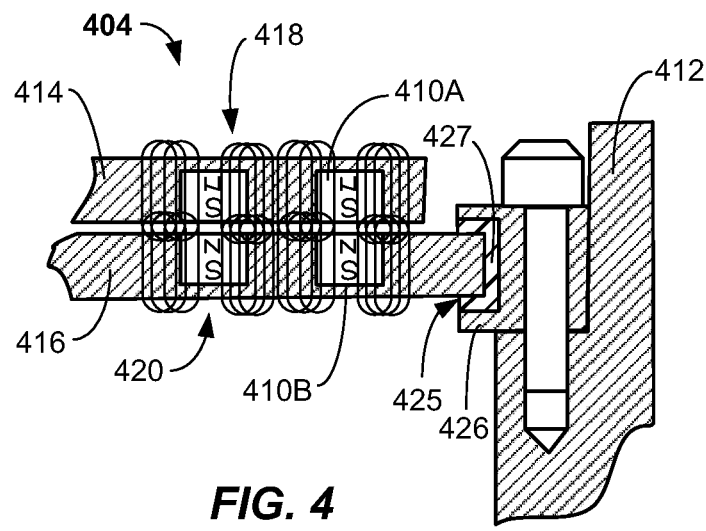
FIG. 4 illustrates a partial cross-sectioned side view of an alternative radial magnetic damping apparatus having a flexible support supporting one or more of the upper and lower members according to embodiments.

In another embodiment of a radial magnetic damping apparatus 404, as shown in FIG. 4, a first permanent magnet set 418 is mounted to an upper member 414, and a second permanent magnet set 420 is mounted to a lower member 416. In the depicted embodiment, the magnetic field-producing members 410A, 410B (e.g., permanent magnets) in the first and second magnet sets 418, 420 are substantially axially aligned when the thrust bearing 102 is radially centered; the same as the FIG. 2C embodiment. Otherwise, the construction is as described above, except that one or more of the upper or lower members 414, 416 may include one or more flexible supports 425. The flexible support 425 may be a layer of elastomer material, for example. In one or more embodiments, the flexible support 425 may comprise a layer of elastomer exhibiting suitable damping properties. For example, the elastomer may be a damped elastomer, such as silicone, fluorosilicone, or other suitable relatively high damping material. The material damping may be selected to provide sufficient damping in order to critically or near critically damp the whirl vibration of the rotor shaft 106. The upper and/or lower members 414, 416 may be in contact with or at least partially surrounded by the flexible support 425. Any suitable construction of the flexible support 425 may be used.

Thus, in this flexibly supported embodiment, vibration of the rotor shaft 106 produces radial misalignment between the magnet sets 418, 420 and the attractive forces between the N and S poles of the respective magnetic field-producing members 410A, 410B causes a restorative force to cause the rotor shaft 106 to move back towards a centered position in the thrust bearing assembly 102. The flexible support 425 may provide suitable internal hysteresis damping to damp any transient vibration and cause the re-centering of the rotor shaft 106 to occur more rapidly. In the embodiments shown in FIG. 4, the flexible support 425 is provided as an annular layer 427 between the lower member 416 and an outer ring 426. The layer 427 may substantially surround a radial extent of the lower member 416. The layer 427 may lie at least partially above and/or below the lower member 416 to constrain vertical motion thereof. The outer ring 426 may be coupled to the bearing housing 412, such as by suitable fasteners (e.g., bolts or screws). A similar flexible support 425 may be provided on the upper member 414 and be coupled to a like ring that may, in turn, be coupled to the thrust load member (e.g., 117) or directly to a step on the rotor shaft 106.

Figure 5:
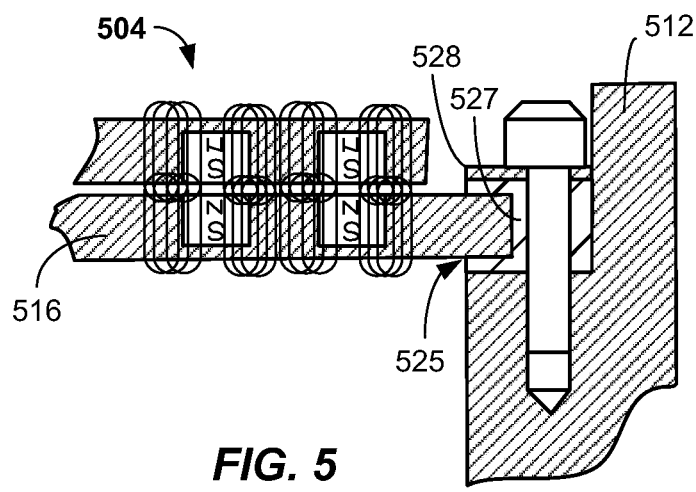
FIGS. 5-6 illustrate partial cross-sectioned side views of alternative radial magnetic damping apparatus having different types of flexible supports according to embodiments.
Figure 6:
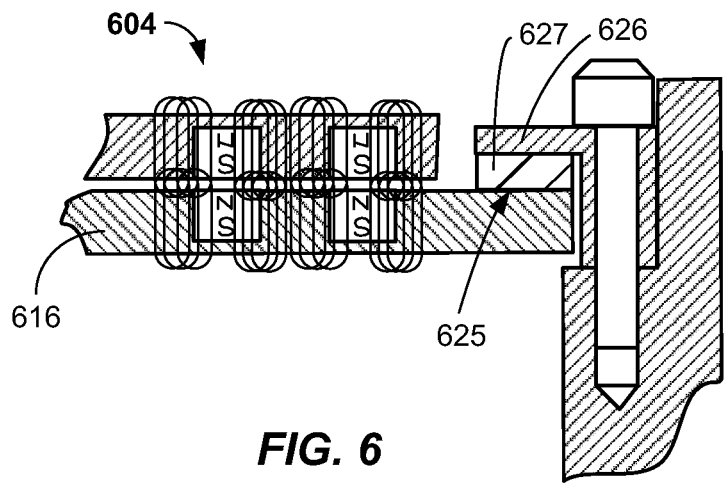

In other embodiments, the flexible support 425 may be secured directly to the bearing housing 412, or even to the motor housing. Alternate constructions of the flexible support 525, 625 are shown in FIGS. 5 and 6. FIG. 6 shows an embodiment of the layer 627 that is provided in an orientation to receive pure shear strain upon encountering radial vibration of the rotor shaft 106. The layer 627 may have an annular disc shape. Each of the layers 427, 527, and 627 may be an elastomer material exhibiting hysteresis damping properties. The layers 427, 527, and 627 may be bonded to the members 416, 516, 616, to the outer rings 426, 526, and 626, or both. In some embodiments, the layer may be mechanically constrained.

For example, in FIG. 5, the layer 527 may be unbounded and stretched over the lower member 516, and constrained in place by washer 528. In other embodiments, the flexible support may be bonded directly to the bearing housing (e.g., to bearing housing 111), or even directly to the housing of the motor 101. Other constructions of the flexible support may be used.

Figure 7:
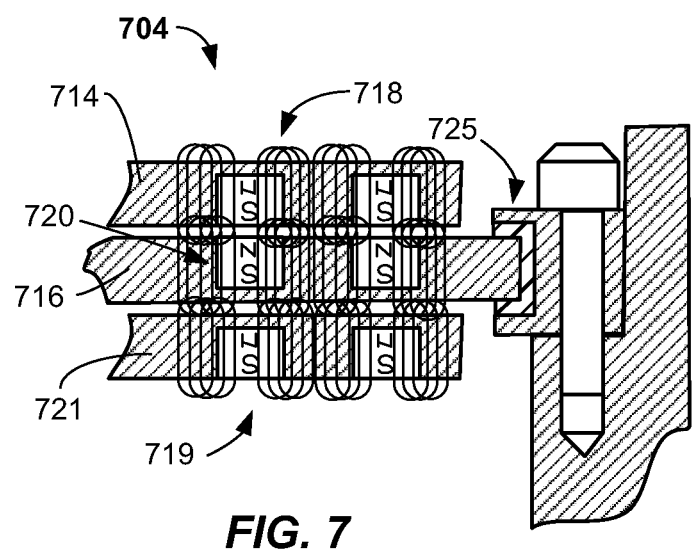
FIG. 7 illustrates a partial cross-sectioned side view of an alternative radial magnetic damping apparatus having three overlapping members according to embodiments.

FIG. 7 illustrates another embodiment of a radial magnetic damping apparatus 704. The radial magnetic damping apparatus 704 includes a first permanent magnet set 718 which is mounted to an upper member 714, and a second permanent magnet set 720 which is mounted to a first lower member 716 as previously described. In this embodiment, a second lower member 721 is provided being overlapped by the first lower member 716. A third permanent magnet set 719 is mounted to the second lower member 721. In the depicted embodiment, the magnetic field-producing members (e.g., permanent magnets) in each of the first, second, and third magnet sets 718, 720, 719 are substantially axially aligned when the thrust bearing assembly 102 is radially centered in its neutral orientation. Other than having a second lower member 721 and third magnet set 719, the construction is as described above. One or more of the upper or the lower first and second members 714, 716, 721 may include one or more flexible supports 725. As a result of the addition of the second lower member 721 and third magnet set 719, a zero net thrust condition may be provided. In other words, the attractive force in the axial direction between the first magnet set 718 and the second magnet set 720 tending to pull the second member 716 upward is substantially balanced by the approximately equal force pulling downward due to the attraction between the second magnet set 720 and the third magnet set 719.

Figure 8:
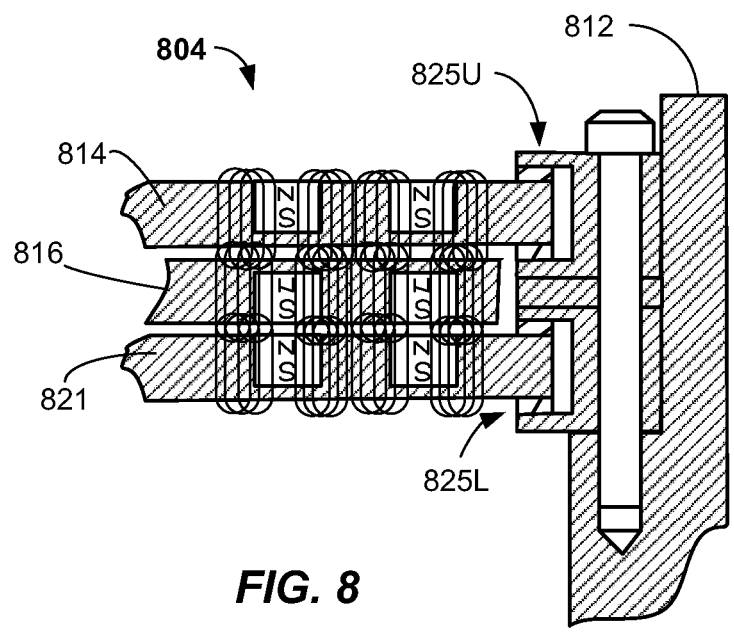
FIGS. 8 and 9 illustrate partial cross-sectioned side views of alternative radial magnetic damping apparatus having multiple overlapping members according to embodiments.

FIG. 8 illustrates an embodiment of a radial magnetic damping apparatus 804 where two members, namely upper member 814 and second lower member 821 are coupled to the outer bearing housing 812, such as by flexible supports 825U, 825L. In the depicted embodiment, the magnetic field-producing members (e.g., permanent magnets) in each of the first, second, and third magnet sets are substantially axially aligned when the thrust bearing assembly 102 is radially centered. The first lower member 816 may be rigidly connected to the rotor shaft 106 or the thrust load member 117. Optionally, the first lower member 816 may be flexibly supported via a flexible support like flexible supports 825U, 825L.

Figure 9:
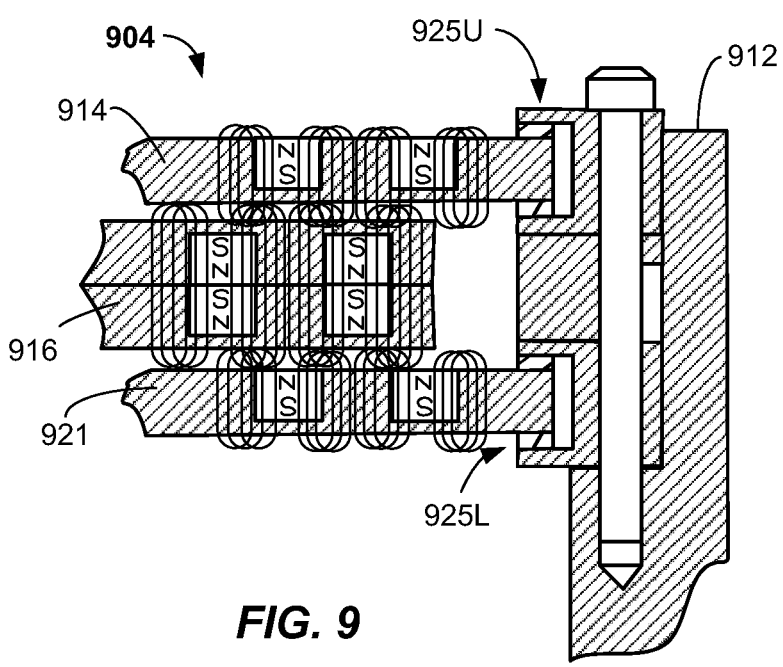

FIG. 9 illustrates an embodiment of a radial magnetic damping apparatus 904 where two members, namely upper member 914 and second lower member 921 may be coupled to the outer bearing housing 912, such as by flexible supports 925U, 925L. In the depicted embodiment, the magnetic field-producing members (e.g., permanent magnets) in each of the first, second, and third magnet sets are substantially axially misaligned when the thrust bearing assembly 102 is radially centered. The centered and neutral orientation of the magnet sets may be such that equidistant spacing is provided between adjacent magnets of the upper member 914 and the second lower member 921, as shown. The repulsion of the N-N and S-S poles in the magnet sets provides restorative forces when radial vibration of the rotor shaft 106 is encountered. Similarly, the addition of the second lower member 921 provides a configuration that may have a substantially net zero axial force acting on the rotor shaft 106. In this depicted embodiment, the first lower member 916 contains axially stacked magnets that are captured between discs. In each of the above-depicted embodiments a thrust bearing 102 as described in FIG. 1 would be coupled between the shaft 106 and the motor housing 101 below the radial magnetic damping apparatus 304, 404, 504, 604. 704, 804, and 904.

Figure 10:
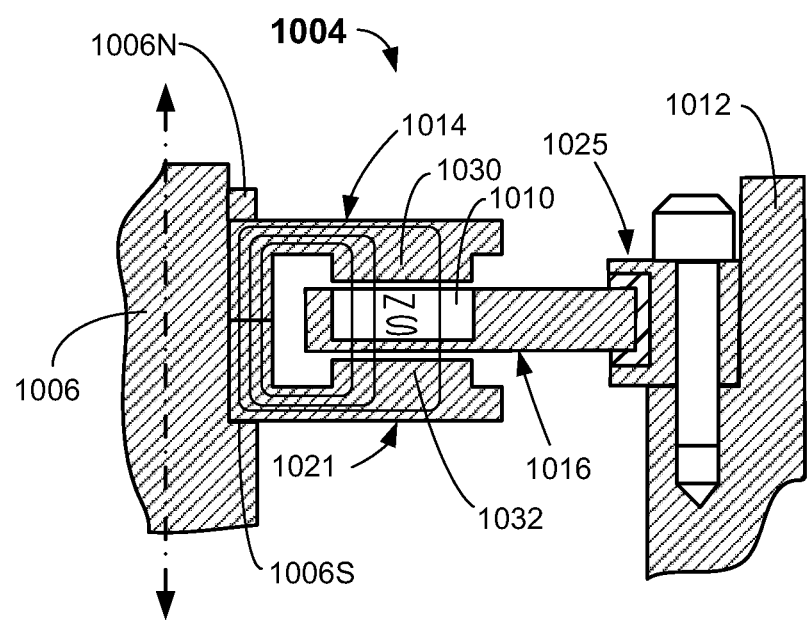
FIG. 10 illustrates a cross-sectioned side view of alternative radial magnetic damping apparatus according to embodiments.

FIG. 10 illustrates an alternative embodiment of a radial magnetic damping apparatus 1004 including two members, namely upper member 1014 which may be coupled to the shaft 1006 (only a portion shown) by any suitable means, such as by step 1006S and nut 1006N shown, and a lower member 1016 which may be coupled to the bearing housing 1012 by a flexible support 1025. This orientation may be reversed in some embodiments. A second lower member 1021 may be provided below the lower member 1016. In the depicted embodiment, the magnetic field-producing member 1010 (e.g., a permanent magnet ring) acts magnetically on flux poles 1030, 1032 in each of the upper member 1014 and the lower member 1016. The magnetic field-producing member 1010 is oriented such that the N and S poles are substantially opposed to and aligned with the flux poles 1030, 1032 of the upper member 1014 and second lower member 1021, which act as flux carrying members (magnetic flux lines shown). The N and S poles are substantially axially aligned when the thrust bearing assembly (not shown, but mounted to the shaft 1006 below the radial magnetic damping apparatus 1004) is radially centered. The attraction forces of N and S poles of the magnetic field-producing member 1010 on the flux poles 1030, 1032 provides a restorative force when radial vibration of the rotor shaft 1006 is encountered that misaligns the shaft 1006 radially. The upper member 1014 and the second lower member 1021 may be steel and can be two pieces as shown or even three pieces (including a central spacer) in some embodiments. The upper and second lower members 1014, 1021 may be made of M470-65 steel, but any ferromagnetic material can be used. The selection of the material of the members 1014, 1021 and the grade of magnetic field-producing member 1010 determines the possible radial restorative forces produced. Lower member 1016 may be any suitably rigid material such as steel.

Figure 11:
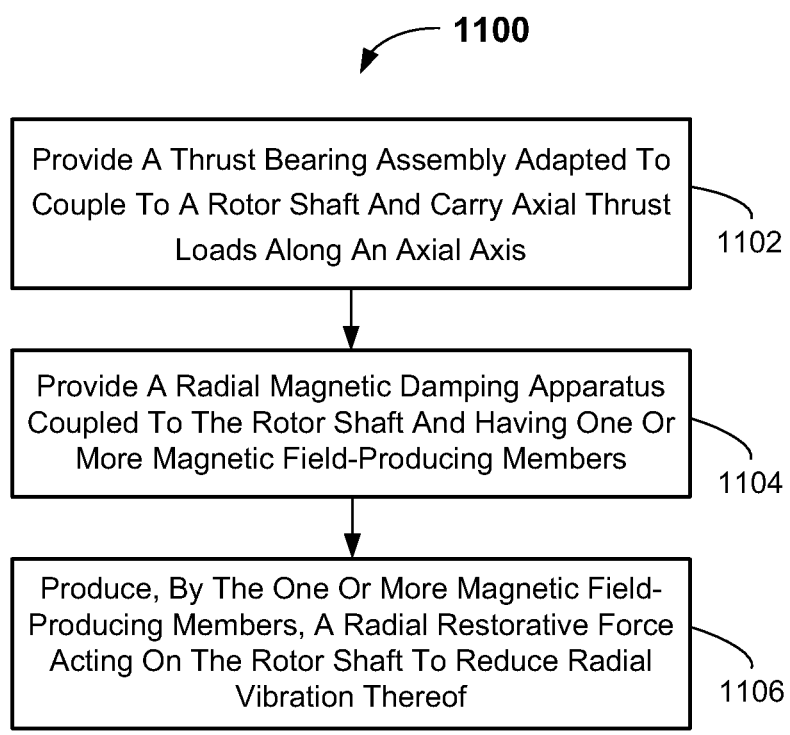
FIG. 11 is a flowchart illustrating a method of damping radial vibration of a rotor shaft of a motor according to embodiments.

FIG. 11 illustrates a flowchart of a method of damping radial vibration of rotor shaft (e.g., rotor shaft 106) of a vertical motor (e.g., vertical motor 101) according to embodiments. The method 1100 includes, in 1102, providing a thrust bearing assembly (e.g., thrust bearing assembly 102) adapted to couple to the rotor shaft (e.g., rotor shaft 106) and carry axial thrust loads along an axial axis (e.g., axial axis 108) and, in 1104, providing a radial magnetic damping apparatus (e.g., radial magnetic damping apparatus) coupled to the rotor shaft (e.g., rotor shaft 106) and having one or more magnetic field-producing members (e.g., one or more magnetic field-producing members 110A, 110B). The method further includes producing in 1106, by the one or more magnetic field-producing members (e.g., one or more magnetic field-producing members 110A, 110B), a radial restorative force acting on the rotor shaft (e.g., rotor shaft 106) to reduce radial vibration thereof.

While the invention is susceptible to various modifications and alternative forms, specific embodiments and methods thereof have been shown by way of example in the drawings and are described in detail herein. It should be understood, however, that it is not intended to limit the invention to the particular apparatus, systems, or methods disclosed, but, to the contrary, the intention is to cover all modifications, equivalents and alternatives falling within the scope of the invention.

What is claimed is:
1. A bearing support assembly, comprising:
a thrust bearing for coupling to a rotor shaft and carrying axial thrust loads along an axial axis; and a radial magnetic damping apparatus comprising an upper member and a lower member that at least partially axially overlap each other, the upper member comprising a first permanent magnet set and the lower member comprising a second permanent magnet set, each permanent magnet set having a plurality of magnetic field-producing members providing radial magnetic force acting on the rotor shaft to reduce radial vibration thereof, wherein the thrust bearing comprises:

a bearing housing; and a thrust block member for coupling to the rotor shaft, wherein one of the upper member and the lower member is coupled to the bearing housing, and the other of the upper member and lower member is coupled to the thrust block member.

2. The bearing support assembly of claim 1, wherein the first permanent magnet set and the second permanent magnet set have north poles and south poles that are aligned substantially parallel to the axial axis.

3. The bearing support assembly of claim 1, wherein the upper member and the lower member are disc plates, and wherein each disc plate contains a permanent magnet set.

4. The bearing support assembly of claim 1, wherein the magnetic field-producing members in the first and second permanent magnet sets in the upper member and the lower member are arranged in a pattern surrounding the rotor shaft.

5. The bearing support assembly of claim 1, the thrust bearing assembly comprising an inner bearing member, the thrust block member being in contact with and carrying axial force through an axial thrust support coupled to the inner bearing member.

6. The bearing support assembly of claim 5, the thrust bearing assembly comprising a reverse thrust support coupled to the inner bearing member.

7. A bearing support assembly, comprising:

a bearing housing;

a rotor shaft;

a thrust bearing assembly mounting the rotor shaft to the bearing housing and configured to carry axial thrust loads; and a radial magnetic damping apparatus comprising an upper member and a lower member that at least partially axially overlap each other, the upper member comprising a first permanent magnet set and the lower member comprising a second permanent magnet set, each permanent magnet set having a plurality of magnetic field-producing members providing radial magnetic force to reduce radial vibration transmitted between the rotor shaft and the bearing housing, the thrust bearing assembly comprising a thrust block member for coupling to the rotor shaft, the thrust block member being in contact with and carrying axial force through an axial thrust support coupled to an inner bearing member.

8. The bearing support assembly of claim 7, the thrust bearing assembly comprising a reverse thrust support coupled to the inner bearing member.

* * * * *